United States Patent
Lu

(10) Patent No.: US 9,182,055 B2
(45) Date of Patent: Nov. 10, 2015

(54) CABLE DRAG CHAIN

(71) Applicant: HON HAI PRECISION INDUSTRY CO., LTD., New Taipei (TW)

(72) Inventor: Hung-Chun Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/559,170

(22) Filed: Dec. 3, 2014

(65) Prior Publication Data
US 2015/0211658 A1    Jul. 30, 2015

(30) Foreign Application Priority Data
Jan. 27, 2014  (TW) .............................. 103102854 A

(51) Int. Cl.
*F16G 13/16* (2006.01)
*F16L 3/015* (2006.01)

(52) U.S. Cl.
CPC ................ *F16L 3/015* (2013.01); *F16G 13/16* (2013.01)

(58) Field of Classification Search
CPC .................. F16L 3/015; F16G 13/16
USPC .......................................... 59/78.1
See application file for complete search history.

(56) References Cited

U.S. PATENT DOCUMENTS

| 7,677,024 B2* | 3/2010 | Utaki ............................. 59/78.1 |
| 8,739,507 B2* | 6/2014 | Hughes ......................... 59/78.1 |
| 2008/0060339 A1* | 3/2008 | Howard ........................... 59/84 |

* cited by examiner

*Primary Examiner* — David B Jones
(74) *Attorney, Agent, or Firm* — Novak Druce Connolly Bove + Quigg LLP

(57) ABSTRACT

A cable drag chain includes a first chain including a plurality of first connecting members each including a base plate and two mounting plates each defining a slot, a second chain including a plurality of second connecting members each including a base board and two mounting boards each defining a through hole, and two latching members each including a post. The base plates are coupled with each other end-to-end to form the first chain, and the base boards are coupled with each other end-to-end to form the second chain. The two posts of the two latching members detachably engage in the two slots of the first connecting member and the two slots of the second connecting member located at two opposite ends of the cable drag chain.

15 Claims, 6 Drawing Sheets

CABLE DRAG CHAIN

FIELD

The subject matter herein generally relates to a cable drag chain.

BACKGROUND

Cable drag chains are widely used to support and guide electric cables.

BRIEF DESCRIPTION OF THE DRAWINGS

Implementations of the present technology will now be described, by way of example only, with reference to the attached figures.

DETAILED DESCRIPTION

Figure 1:
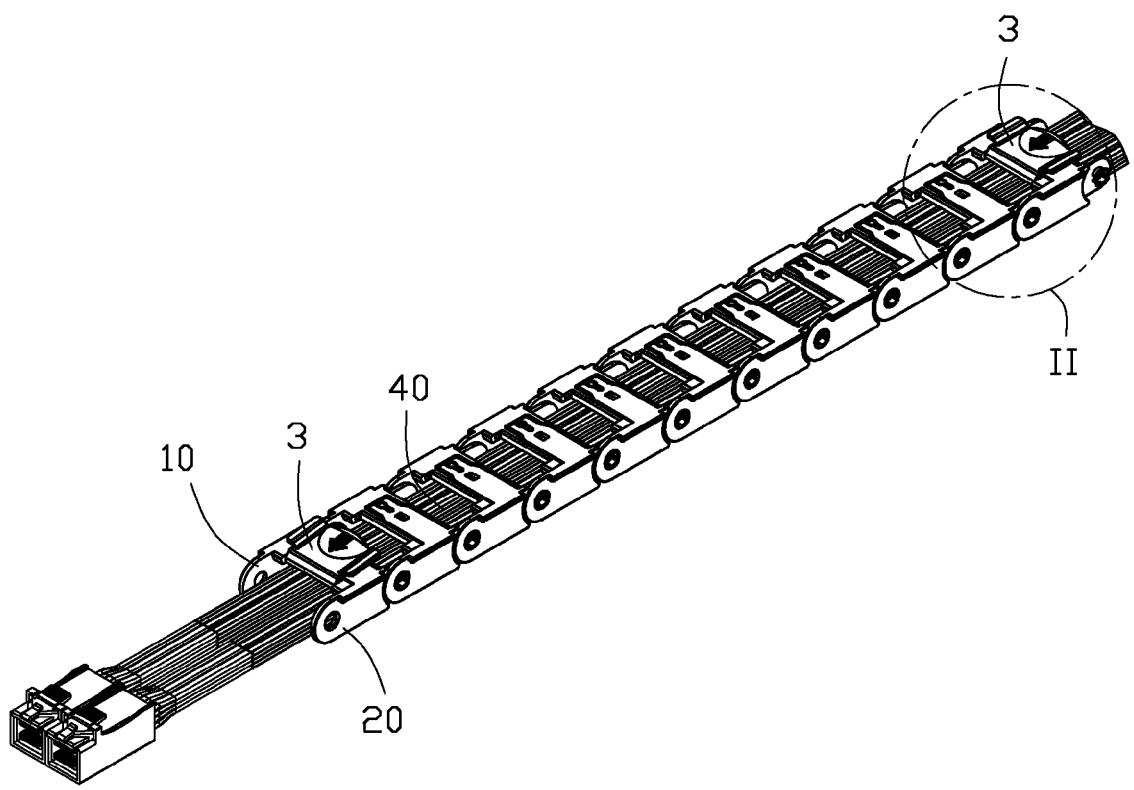
FIG. 1 is an assembled, isometric view of an embodiment of a cable drag chain and a cable.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably connected. The term "comprising" means "including, but not necessarily limited to"; it specifically indicates open-ended inclusion or membership in a so-described combination, group, series and the like.

The present disclosure describes a cable drag chain.

Figure 3:
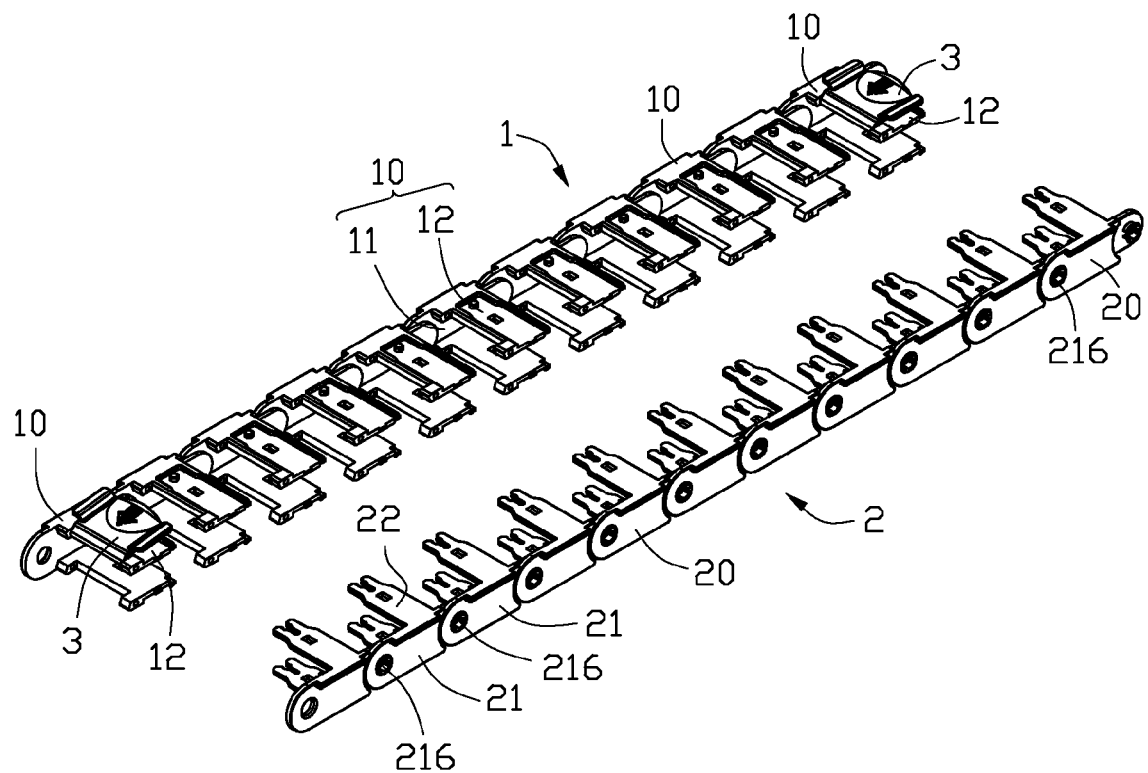
FIG. 3 is an isometric view of FIG. 1, wherein a first chain is separated from a second chain.

FIGS. 1 and 3 illustrate that an embodiment of the cable drag chain for holding a cable 40. The cable drag chain can comprise a first chain 1, a second chain 2, and two latching members 3. The first chain 1 can comprise a plurality of first connecting members 10. The second chain 2 can comprise a plurality of second connecting members 20. The number of the first connecting members 10 is equal to the number of the second connecting members 20.

Figure 4:
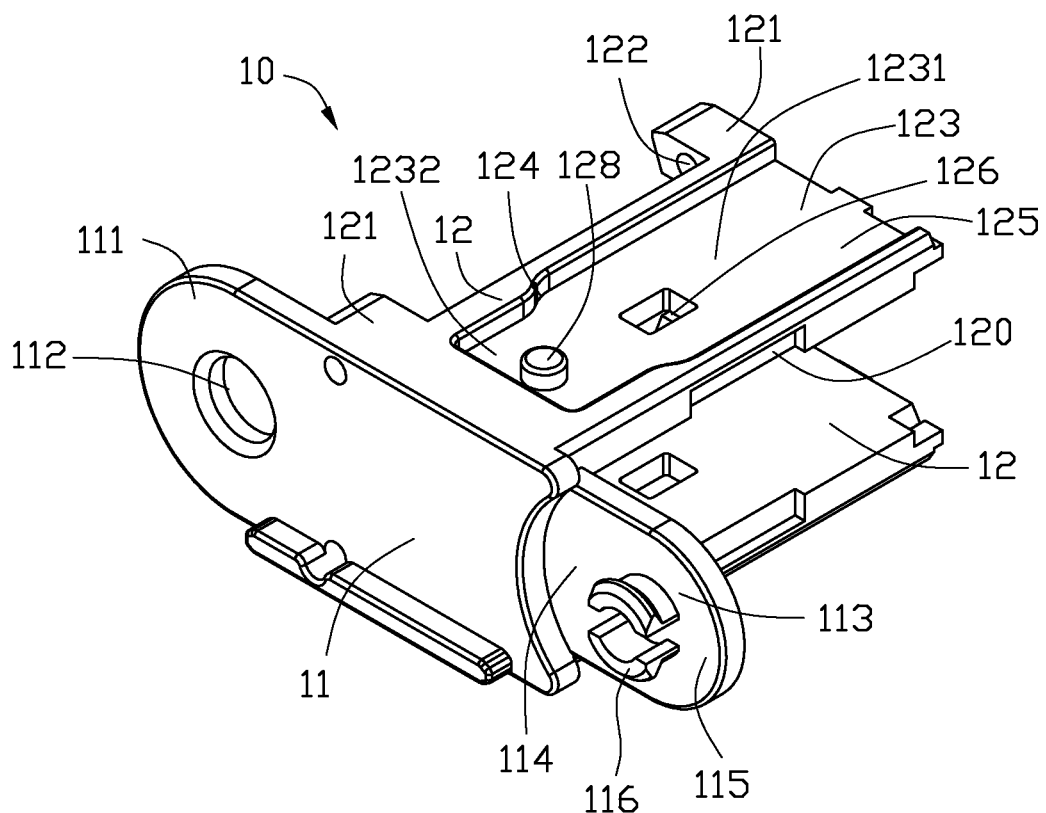
FIG. 4 is an isometric view of a first connecting member of the first chain of FIG. 1.

FIG. 4 illustrates that each first connecting member 10 can comprise a base plate 11 and two parallel mounting plates 12 extending perpendicularly from an inside of the base plate 11. An arced extension plate 111 extends from a first end of the base plate 11 and an arced notch 113 is formed at a second end of the base plate 11. An arced extension tab 115 extends from the inside of the base plate 11 at the second end. A through hole 112 is defined in the extension plate 111. A receiving space 114 is defined between the base plate 11 and the extension tab 115. A pair of elastic hooks 116 extends from an outside of the extension tab 115 opposite to each other. A pair of blocks 121 extends from two opposite ends of a first side of each mounting plate 12 near the extension plate 111. Each block 121 defines a pivoting through hole 122 in a direction perpendicular to the base plate 11. A notch 120 is defined in a second side of each mounting plate 12 opposite to the first side. A long recessed portion 123 is defined in an outer surface of each mounting plate 12. A width of a first portion 1232 of the recessed portion 123 near the base plate 11 is narrower than a width of a second portion 1231 of the recessed portion 123 away from the base plate 11. A connecting portion 124 is slantingly connected between the first portion 1231 and the second portion 1232 of the recessed portion 123. A through slot 126 is defined in a bottom wall 125 of the receiving groove 123 and a post 128 extends from the bottom wall 125.

Figure 5:
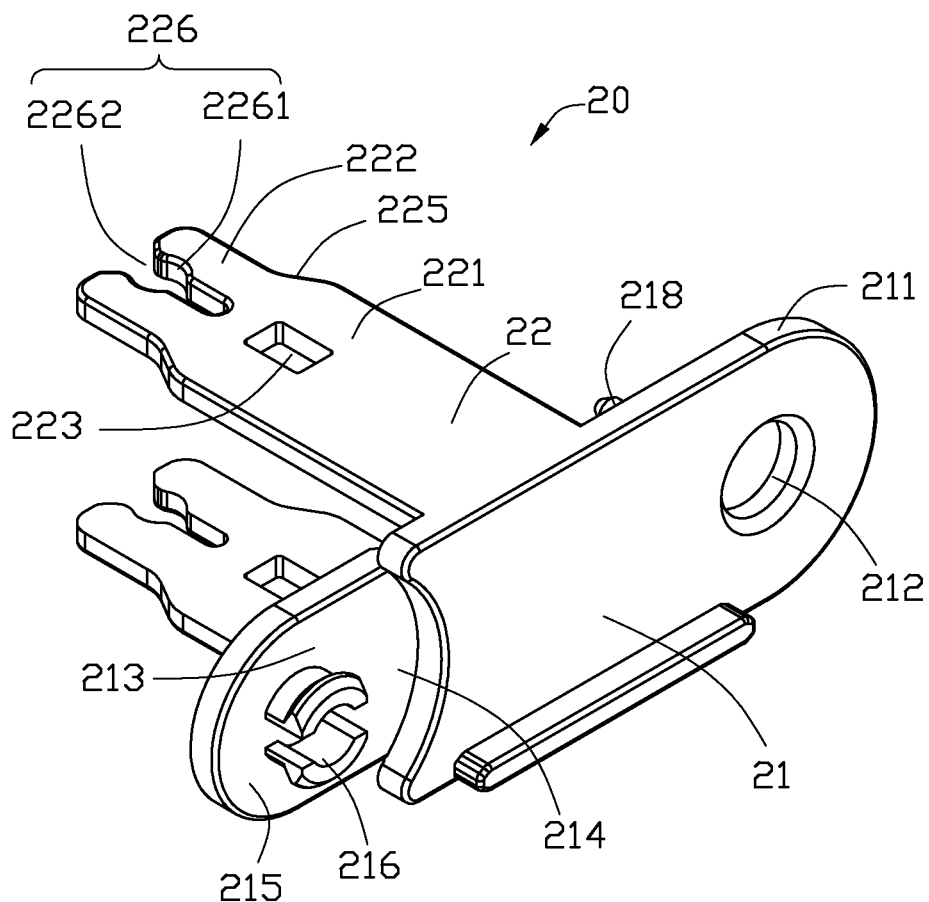
FIG. 5 is an isometric view of a second connecting member of the second chain of FIG. 1.

FIG. 5 illustrates that each second connecting member 20 can comprise a base board 21 and two long parallel mounting boards 22 extending perpendicularly from an inside of the base board 21. An arced extension board 211 extends from a first end of the base board 21 and an arced notch 213 is formed at a second end of the base board 21. An arced extension tab 215 extends from the inside of the base board 21 at the second end. A through hole 212 is defined in the extension board 211. A receiving space 214 is defined between the extension tab 215 and base board 21. A pair of elastic hooks 216 extends from the extension tab 215, opposite to each other. Two pins 218 extend from the inside of the base board 21 beside the two mounting plates 22, adjacent the extension board 211. Each mounting board 22 comprises a first portion 221 near the base board 21 and a second portion 222 away from the base board 21. The first portion 221 is wider than the second portion 222. A connecting portion 225 is slantingly connected between the first portion 221 and the second portion 222. The first portion 221 defines a through slot 223. The second portion 222 defines a notch 226 comprising a round engaging slot 2261 and a guiding groove 2262 extending from the engaging slot 2261 and through an end of the second portion 222 away from the base board 21.

Figure 6:
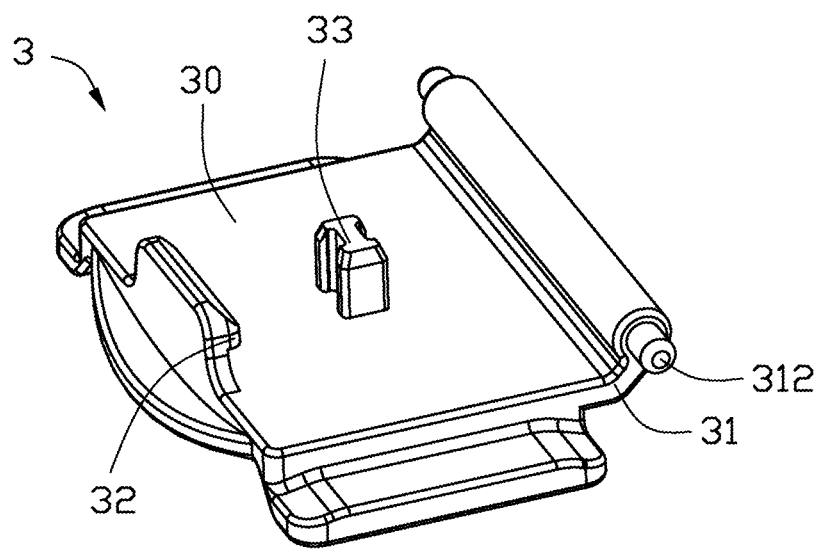
FIG. 6 is an isometric view of a latching member of FIG. 1.

FIG. 6 illustrates that each latching member 3 can comprise a base 30, an extending portion 31 formed at a first end of the base 30, a latch 32 formed at a second end of the base 30 opposite to the first end, and a post 33 extending from the base 30 and located between the extending portion 31 and the latch 32. A shaft 312 is formed at a side of the extending portion 31 away from the latch 32.

FIG. 3 illustrates the first chain 1 in assembly. The base plates 11 of the first connecting members 10 are sequentially coupled one by one to form the first chain 1. In detail, the extension plate 111 of each first connecting member 10 is received in the receiving space 114 of the neighboring first connecting member 10. The two hooks 116 of each neighboring first connecting member 10 extend through the through hole 112 of the neighboring base plate 11, and engage with an outside of the extension plate 111 of the neighboring base plate 11.

FIG. 3 illustrates the two latching members 3 and the first chain 1 in assembly. The two latching members 3 are pivotably attached to the two first connecting members 10 located at two opposite ends of the first chain 1. In detail, the extending portion 31 of each latching member 3 is placed between the corresponding pair of pivoting blocks 121 of the corresponding first connecting member 10. The shaft 312 of each latching member 3 engages in the two corresponding pivoting holes 122 of the corresponding first connecting member 10.

FIG. 3 illustrates the second chain 2 in assembly. The base boards 21 of the second connecting members 20 are sequentially coupled one by one to form the second chain 2. In detail, the extension board 211 of each second connecting member 20 is received in the receiving space 214 of the neighboring second connecting member 20. The two hooks 216 of each base board 21 extend through the through hole 212 of the neighboring base board 21, and engage with an outside of the extension board 211 of the neighboring base board 21.

Figure 2:
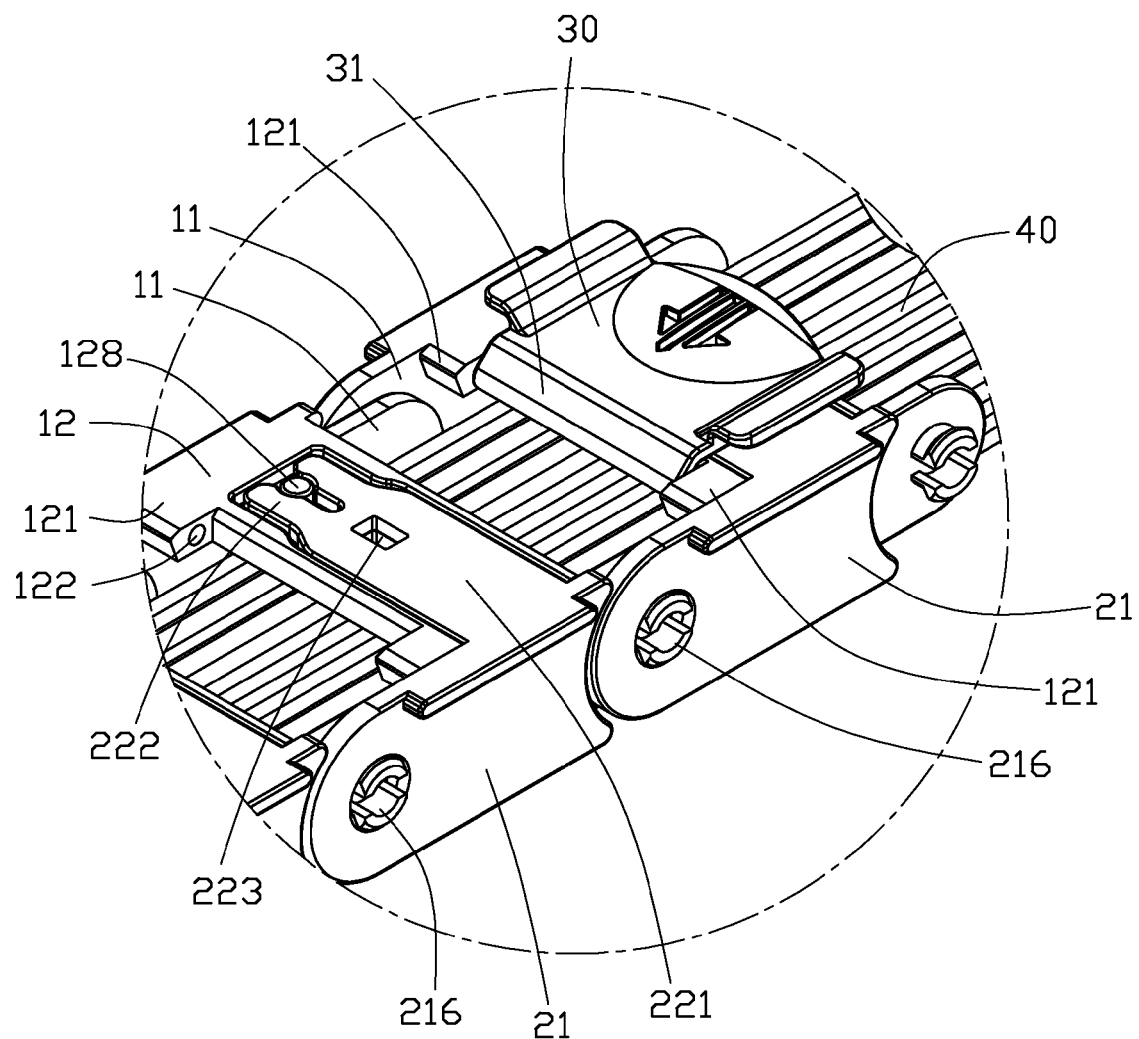
FIG. 2 is an enlarged view of circled portion II of FIG. 1.

FIGS. 1 and 2 illustrate the first chain 1 and the second chain 2 in assembly. Each first connecting member 10 aligns with and engages with the corresponding second connecting member 20, to allow the first chain 1 to engage with the second chain 2 clamping the cable 40. The second portion 222 of each mounting board 22 engages in the second portion 1232 of the corresponding recessed portion 123, and the first portion 221 of each mounting board 22 engages in the first portion 1231 of the corresponding recessed portion 123, and the connecting portion 225 of each mounting board 22 engages with the corresponding connecting portion 124. The two posts 128 of each first connecting member 10 extend through the two guiding grooves 2262 of the corresponding second connecting member 20, and engage in the two engaging slots 2261 of the corresponding second connecting member 20. The two through slots 126 of each first connecting member 10 align with the two through slots 223 of the corresponding second connecting member 20. The two pins 218 of each second connecting member 20 engage in the two corresponding pivoting holes 122 from an outside of the corresponding pivoting holes 122 against the corresponding base plate 11. The cable 40 can extend through the first chain 1 and the second chain 2.

FIGS. 1 and 2 illustrate that the two latching members 3 latch the two first connecting members 10 located at two opposite ends of the first chain 1 to the corresponding second connecting members 20. The two posts 33 of the two latching members 3 extend through the two corresponding through slots 223 of the two second connecting members 20 and the two corresponding through slots 126 of the two first connecting members 10. The two hooks 32 of the two latching members 3 engage with the two corresponding notches 120 of the two corresponding first connecting members 10.

To strengthen the cable drag chain, more latching members 3 can be attached to the first connecting members 10 and the corresponding second connecting members 20.

When a minimum strength of the cable drag chain is satisfied, only one latching member 3 is needed to be mounted to the first connecting member 10 and the corresponding second connecting member 20.

The embodiments shown and described above are only examples. Many details are often found in the art such as the other features of a cable drag chain. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A cable drag chain for holding a cable, the cable drag chain comprising:
    a first chain comprising a plurality of first connecting members each comprising a base plate and two mounting plates extending from the base plate in a same direction;
    a second chain comprising a plurality of second connecting members each comprising a base board and two mounting boards extending from the base board in a same direction; and
    a pair of latching members;
    wherein the base plates of the first connecting members are sequentially coupled one by one to form the first chain, the base boards of the second connecting members are sequentially coupled together one by one to form the second chain, the mounting plates of the first connecting members are detachably attached to the mounting boards of the second connecting members respectively to hold the cable therebetween, each mounting plate defines a through slot, each mounting board defines a through slot, each latching member comprises a post, the two posts of the two latching members detachably extend through two corresponding through slots of the two first connecting members located at two opposite ends of the cable drag chain and engage in two corresponding slots of the two second connecting members located at two opposite ends of the cable drag chain.

2. The cable drag chain of claim 1, wherein the latching members are pivotably attached to the two first connecting members.

3. The cable drag chain of claim 2, wherein each mounting plate comprises a pair of spaced blocks each defining a through pivoting hole in a direction perpendicular to the base plate, and each latching member comprises a shaft disposed between the corresponding pair of blocks and pivotably engaging in the corresponding pivoting holes.

4. The cable drag chain of claim 2, wherein each mounting plate comprises a pair of spaced blocks each defining a through pivoting hole in a direction perpendicular to the base plate, each base board comprises a pair of pins extending therefrom located beside the mounting boards to engage in the corresponding pivoting holes.

5. The cable drag chain of claim 3, wherein each of the latching member comprises a latch, the corresponding mounting plate comprises a notch configured to engage with the latch.

6. The cable drag chain of claim 1, wherein each base plate comprises a recessed portion defined in an outer surface thereof for clamping the corresponding base board therein.

7. The cable drag chain of claim 6, wherein each mounting board defines a notch extending through an end thereof away from the base board, each mounting plate comprises a post formed in the recessed portion near the base plate to engage in the notch.

8. The cable drag chain of claim 7, wherein each notch comprises an engaging slot near the base board, and a guiding groove away from the base board and communicating with the engaging slot.

9. The cable drag chain of claim 7, wherein each of the mounting board comprises a first portion near the base board, a second portion away from the base board and wider than the first portion, and a connecting portion slantingly connected between the first portion and the second portion, the notch is defined in the second portion, the recessed portion of each mounting plate comprises a second portion to receive the first portion of the mounting board, a first portion to receive the second portion of the mounting board.

10. The cable drag chain of claim 1, wherein each base board comprises a through hole defined in a first end thereof and a pair of elastic hooks extending from a second end thereof opposite to the first end, the pair of the hooks of the second connecting member detachably engages in the through holes of the neighboring second connecting member.

11. The cable drag chain of claim 1, wherein each base plate comprises a through hole defined a first end thereof and a pair of elastic hooks extending from a second end thereof opposite to the first end, the pair of the hooks of the first connecting member detachably engages in the through holes of a neighboring first connecting member.

12. A cable drag chain assembly comprising:
a cable;
a first chain comprising a plurality of first connecting members each comprising a base plate and two mounting plates extending from the base plate in a same direction;
a second chain comprising a plurality of second connecting members each comprising a base board and two mounting boards extending from the base board in a same direction; and
a pair of latching members;
wherein the base plates of the first connecting members are sequentially coupled one by one to form the first chain, the base boards of the second connecting members are sequentially coupled together one by one to form the second chain, the mounting plates of the first connecting members are detachably attached to the mounting boards of the second connecting members respectively to hold the cable therebetween, each mounting plate defines a through slot, each mounting board defines a through slot, each latching member comprises a post, the two posts of the two latching members detachably extend through two corresponding through slots of the two first connecting members located at two opposite ends of the cable drag chain and engage in two corresponding slots of the two second connecting members located at two opposite ends of the cable drag chain.

13. The cable drag chain assembly of claim 12, wherein the latching members are pivotably attached to and latch with the two first connecting members.

14. The cable drag chain assembly of claim 12, wherein each base board comprises a through hole defined in a first end thereof and a pair of elastic hooks extending from a second end thereof opposite to the first end, the pair of the hooks of the second connecting member detachably engages in the through holes of the neighboring second connecting member.

15. The cable drag chain assembly of claim 12, wherein each base plate comprises a through hole defined a first end thereof and a pair of elastic hooks extending from a second end thereof opposite to the first end, the pair of the hooks of the first connecting member detachably engages in the through holes of a neighboring first connecting member.

* * * * *